United States Patent Office 3,703,586
Patented Nov. 21, 1972

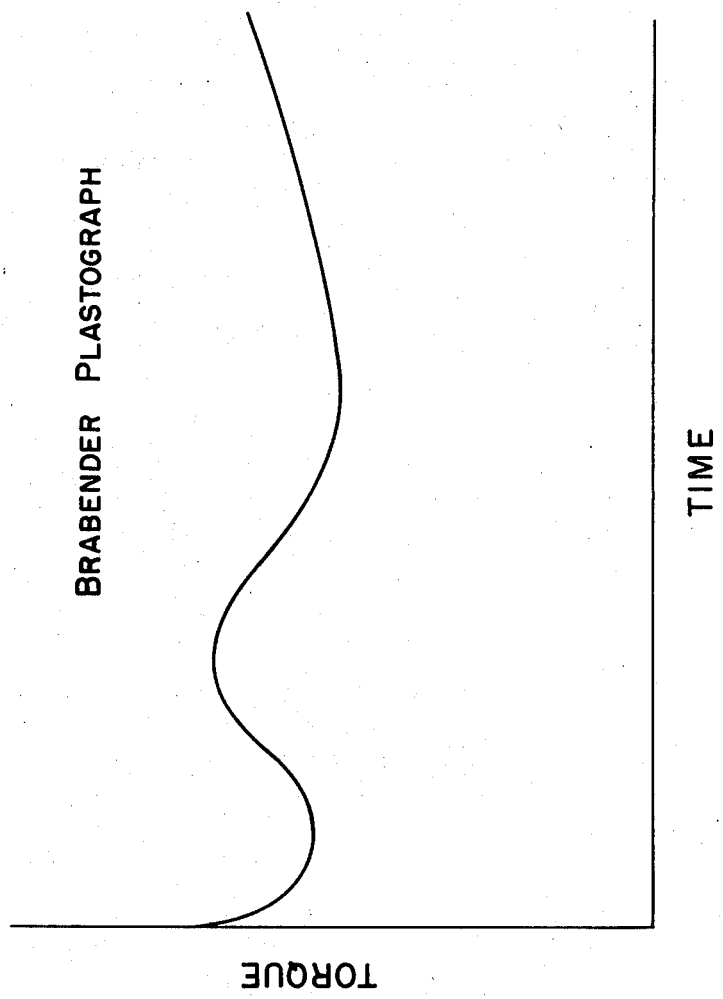

3,703,586
STABILIZATION OF POLYMERS AGAINST POST-POLYMERIZATION CROSSLINKING
Bruce W. Habeck, Cuyahoga Falls, and Donald E. Miller, Akron, Ohio, assignors to The Goodyear Tire and Rubber Company, Akron, Ohio
Original application Oct. 19, 1967, Ser. No. 676,428, now Patent No. 3,563,949, dated Feb. 16, 1971. Divided and this application Sept. 18, 1970, Ser. No. 73,604
Int. Cl. C08f 45/58
U.S. Cl. 260—45.95 R
6 Claims

ABSTRACT OF THE DISCLOSURE

Polymers containing divinyl benzene and stabilized with phenolic stabilizers such as 2,5-ditert.butyl hydroquinone and 4,4'-methylene bis(2,6-ditert.butyl phenol).

This is a division of application Ser. No. 676,428, filed Oct. 19, 1967 and issued Feb. 16, 1971, as U.S. Pat. 3,563,949.

This invention relates to the stabilization with various stabilizers of polymers containing divinyl benzene.

Rubbery polymers such as butadiene/styrene copolymers and butadiene/acrylonitrile copolymers are known to be subject to oxidative degradation. It is known to stabilize such polymers against oxidative degradation by the addition of various nondiscoloring antioxidants such as phenolic antioxidants. Polymers prepared from monomer systems containing divinyl benzene (DVB) present a special stabilization problem. In addition to being subject to oxidative degradation such polymers are also subject to crosslinking on storage and during processing. This post polymerization crosslinking apparently stems from the divinyl benzene used in their manufacture. Such crosslinking is undesirable primarily from a processing standpoint, e.g., processing immediately following the manufacture of the polymer and later processing by the ultimate user of the polymer. This type of reaction differs from oxidative degradation and therefore demands special stabilization systems to aid in the protection of the polymers against this type of reaction. It is therefore desirable to provide stabilizers which will aid in the prevention of such crosslinking. In some instances it is also desirable that the polymer possess a light color. It is therefore often desirable that the stabilizers to be used impart little color to the polymer, be themselves relatively nondiscoloring, and if possible, aid in the prevention of polymer discoloration.

It is an object of this invention to provide stabilizers which will aid in the protection of polymers prepared from monomer systems containing divinylbenzene against post polymerization crosslinking stemming from the use of divinyl benzene in their manufacture and to provide polymers so stabilized. It is a further object of this invention to provide stabilizers which will help to protect DVB polymers against both oxidative degradation and the divinyl benzene type post polymerization crosslinking and to provide polymers so stabilized. It is still another object of this invention to provide stabilizers which will help to protect DVB polymers against post polymerization crosslinking and discoloration and to provide polymers so stabilized.

The objects of this invention are accomplished by a polymer containing (A) 40 to 99.95 parts by weight of bound 1,3-butadiene monomer, (B) .05 to 5.0 parts by weight of bound divinyl benzene monomer and (C) 0 to 59.95 parts by weight of bound acrylonitrile monomer wherein the sum of (A) plus (B) plus (C) equals 100 parts by weight of polymer and having incorporated therein a stabilizing amount of at least one phenolic compound selected from the group consisting of compounds conforming to the following structural formulae:

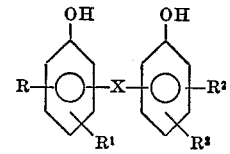

(I)

wherein R, $R^1$, $R^2$ and $R^3$ are selected from the group consisting of hydrogen, alkyl radicals containing 1 to 12 carbon atoms, cycloalkyl radicals containing 5 to 9 carbon atoms and aralkyl radicals contining 7 to 12 carbon atoms and X is selected from the group consisting of $$—CH_2—O—CH_2—$$

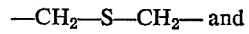

$—CH_2—S—CH_2—$ and

wherein $R^4$ and $R^5$ are selected from the group consisting of hydrogen and alkyl radicals containing 1 to 7 carbon atoms and the sum of the carbon atoms in $R^4$ plus $R^5$ is 0 to 7; and

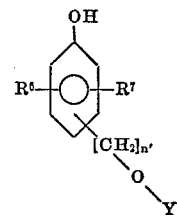

(II)

wherein $R^6$ and $R^7$ are selected from the group consisting of hydrogen, alkyl radicals containing 1 to 12 carbon atoms, cycloalkyl radicals containing 5 to 9 carbon atoms and aralkyl radicals containing 7 to 12 carbon atoms; $n'$ is an integer from 0 to 1; and Y' is selected from the group consisting of hydrogen and alkyl radicals containing 1 to 2 carbon atoms.

Examples of materials conforming to the above structural formulae are as follows:

2,2'-methylenebis(4-methylphenol)
4,4'-isopropylidene bis phenol
α,α'-di(2-hydroxy-5-methylphenyl)dimethylether
α,α'-di(2-hydroxy-5-methylphenyl)dimethyl sulfide
4-methylol phenol
2-methylol-4-methylphenol
4-β-hydroxyethylphenol
2-methoxymethyl-4-methylphenol
4-β-methoxyethylphenol
2,2'-methylene bis(3-α-phenylethyl-5-methylphenol)
4,4'-isopropylidene bis(2-dimethylbenzylphenol)
α,α'-di(2-hydroxy-3-cyclohexyl-5-methylphenyl)dimethylether
α,α'-di(2-hydroxy-3-α-tolylethyl-5-methylphenyl)dimethyl sulfide
2-α-phenylethyl-4-methylol phenol
2-methylol-4-methyl-6-dimethylbenzylphenol
2-cyclohexyl-4-β-hydroxyethylphenol
2-methoxymethyl-4-methyl-6-α-p-tolylethylphenol
2,2'methylenebis(2,4-dimethylphenol)
α,α'-di(2-hydroxy-3-butyl-5-methylphenyl)dimethylether
α,α'-di(2-hydroxy-3,5-dimethylphenyl)dimethyl sulfide
2-methyl-4-methylolphenol
2-ethyl-4-β-hydroxyethylphenol
2-cyclohexyl-4-methylolphenol
2,2'-methylene bis(6-tert.butyl-4-methylphenol)
4,4'-methylene bis(2,6-ditert.butylphenol)
4,4'-isopropylidene bis(2-tert.hexylphenol)

α,α'-di(2-hydroxy-3-butyl-5-tert.amylphenyl)dimethylether
α,α'-di(2-hydroxy-3-tert.hexyl-5-methylphenyl)dimethyl sulfide
2-tert.octyl-4-methylolphenol
2-methylol-4-methyl-6-tert.butylphenol
2,6-ditert.butyl-4-β-hydroxyethylphenol
2-methylcyclohexyl-4-methylol-6-tert.hexylphenol
2-methyl hydroquinone
tert.butyl catechol
tert.butyl resorcinol
ditert.butyl catechol
ditert.amyl resorcinol
2-tert.hexyl hydroquinone
2-α-phenylethyl hydroquinone
2-methylcyclohexyl hydroquinone
2,5-ditert.butyl hydroquinone
2,5-ditert.amyl hydroquinone
2,5-ditert.hexyl hydroquinone
2,5-di(α-phenylethyl) hydroquinone
2,5-di(dimethylbenzyl) hydroquinone
2-tert.butyl-5-tert.octyl hydroquinone
2-tert.butyl-5-α-phenylethyl hydroquinone Preferred phenolic compounds are those conforming to structural Formula I herein wherein X is selected from the group consisting of —CH$_2$—O—CH$_2$— and —CH$_2$—, particularly —CH$_2$—, and those conforming to structural Formula II wherein $R^6$ and $R^7$ are selected from the group consisting of hydrogen, alkyl radicals containing 1 to 7 carbon atoms and cycloalkyl radicals containing 6 to 7 carbon atoms; particularly those wherein $n'$ is 1 and Y is hydrogen.

Polymers offered particularly effective protection in the practice of the present invention are polymers containing (A) 55 to 84.9 parts by weight of bound 1,3-butadiene monomer, (B) 0.10 to 2.5 parts by weight of bound divinyl benzene and (C) 15 to 44.9 parts by weight of bound acrylonitrile monomer wherein the sum of (A) plus (B) plus (C) equals 100 parts by weight of polymer.

The polymers stabilized by the practice of the present invention can be made by well known emulsion polymerization techniques involving the emulsion polymerization of monomer systems comprising 1,3-butadiene, acrylonitrile and divinyl benzene. For example, the polymers may be prepared according to the disclosure at column 3, lines 16 to 35 of U.S. Pat. No. 2,927,093.

Examples of polymers that can be stabilized by the practice of the present invention are:

75/24/1 butadiene/acrylonitrile/DVB
75/24.5/0.5 butadiene/acrylonitrile/DVB
70/29.5/0.5 butadiene/acrylonitrile/DVB
60/39.8/0.2 butadiene/acrylonitrile/DVB
50/49.5/0.5 butadiene/acrylonitrile/DVB
80/15/5 butadiene/acrylonitrile/DVB
90/9.5/0.5 butadiene/acrylonitrile/DVB
40/59.5/0.5 butadiene/acrylonitrile/DVB The stabilizers of the present invention can be incorporated into the polymers of the present invention by any of the conventional methods such as by open mill mixing, Banbury mixing and the addition of solutions, emulsions, suspensions or dispersions of the stabilizers to solutions, emulsions, suspensions or dispersions of the polymers. The method of incorporation is not critical. If the compound is water soluble it is preferred that it not be added to an aqueous latex. Also, it can be preferable to add the stabilizer to the latex if the polymer is made by emulsion polymerization rather than delaying addition until after coagulation and drying, particularly where these processing steps are severe, so as to prevent degradation during processing.

Polymers of the present invention may be effectively stabilized by the addition of 0.10 to 7.0 parts by weight per 100 parts by weight of the polymers of the stabilizers of the present invention, although from 0.50 part to 5.0 parts by weight per 100 parts by weight of polymer is normally adequate, while a preferred range is from 0.50 part to 3.0 parts by weight per 100 parts by weight of polymer.

The phenolic compounds used in the practice of the present invention can be prepared by various methods well known in the art. For example, methylene bis phenols can be prepared as described in U.S. Pat. No. 2,538,355 (Example 5). Bis phenols containing a

—CH$_2$—S—CH$_2$— linkage can be prepared as described in U.S. Pat. No. 3,272,869. Bis phenols containing an —O— linkage can be prepared as described in Burchalter et al., Journal of the American Chemical Society, 68, 1896 (1946). Methylol substituted phenols and bis phenols containing a —CH$_2$—O—CH$_2$— linkage can be prepared as disclosed in Walker, "Formaldehyde," ACS Monograph Series, Reinhold Publishing Corporation, 310-314 (1964). α,α'-Dihydroxy xylene type compounds can be prepared as described in U.S. Pat. No. 2,666,786. Alkylated mononuclear dihydroxy compounds may be prepared as described in British Pat. No. 596,461. Phenols containing a methylol substituent can be prepared as described in U.S. Pat. No. 3,030,428. Phenols containing a

—CH$_2$—O—CH$_2$— radical can be prepared as described in U.S. Pat. No. 2,954,345.

Various substituents such as alkyl, cycloalkyl and aralkyl radicals may be attached to the phenolic nucleus by many well known methods. For example, an alkyl radical may be attached to a phenolic nucleus by reacting a phenol with an olefin in the presence of a Friedel-Crafts catalyst. It is not intended to limit the scope of the present invention by the method of preparation of the compounds since the methods of making the compounds is not critical to the practice of the present invention.

The following examples are representative but not restrictive of the practice of the present invention.

EXAMPLE 1

A butadiene/acrylonitrile/DVB polymer latex having a bound monomer ratio of approximately 70/30/0.25 was prepared by emulsion polymerization. The polymer possessed an ML-4/212° F. of 111. Various phenolic compounds were added to the latex as follows. Those of the phenolic compounds capable of ready emulsification were emulsified. Those phenolic compounds which were not readily emulsifiable were dissolved in a toluene/methyl isobutyl ketone solvent and the solution emulsified. The emulsions were added to the butadiene/acrylonitrile/DVB latex under agitation. The resulting latex was coagulated using magnesium sulfate and the polymer crumb washed with water and dried.

The color of the dried polymer was observed and recorded. After preparation 58 gram portions of each of the polymers containing the stabilizers were subjected to a hot mastication for 60 minutes at 170° C. in a Brabender Corporation Plastograph (Model PL-750 [1]) at a rotor speed of 50 r.p.m. The Plastograph torque was recorded versus time during the mastication and the conditions of the masticated polymer, after complete mastication, observed and recorded. Mooney viscosities (ML-4/212° F.) measurements were made before and after mastication.

The figure depicts a torque curve which is representative of the behavior of a polymer used within the practice of the present invention when masticated in a Brabender Plastograph without adequate stabilization against post polymerization DVB type crosslinking. It is theorized that the hump in the curve results from post polymerization DVB crosslinking, since the polymers which do not exhibit post polymerization crosslinking do not exhibit such a hump. Materials that are considered particularly effec- ---
[1] Equipped with a Banbury style mixing head.

tive as aids in preventing post polymerization DVB crosslinking are those which either completely remove the hump in the torque curve or appreciably diminish it or delay its formation.

Mooney viscosity rise during mastication and the masticated condition of the polymer are considered to be some-measure of degradation to the polymer. A high Mooney rise indicates greater degradation. A masticated polymer in a crumbled condition indicates degradation while a polymer in a massed or semi-massed condition indicates lack of degradation or reduced degradation. All of the polymers containing additives outside the scope of the present invention, Experiments A through C, were in a crumbled condition.

The data and observations are listed in the following Table I. Experiments A, B and C were run using phenolic compounds not within the scope of the present invention. The stabilizers used in Experiments A, B and C are known to be effective antioxidants for oxygen degradation and yet all exhibited pronounced humps in the Brabender curves. Experiments D through V were run using phenolic compounds within the scope of the present invention. In Experiments D through V the hump in the torque curve depicted in the figure was either completely removed or diminished appreciably or delayed.

and greater) during mastication and were in a crumbled condition after mastication indicating degradation of one type or another. All of the polymers stabilized with compounds of the present invention were in a good masticated condition, i.e., massed or semi-massed except the polymers of Experiments S and T, which did, however, remove the hump in the Brabender curve. Most of the polymers stabilized with compounds of the present invention also possessed more lower Mooney rises than the polymers of Experiments A, B and C. Therefore, various phenolic compounds known to be effective antioxidants are poor when used to prevent the DVB type post polymerization crosslinking effect. However, the phenolic compounds of the present invention have been found to be particularly effective in this respect.

While certain representative embodiments and details have been shown for the purpose of illustrating the invention, it will be apparent to those skilled in this art that various changes and modifications may be made therein without departing from the spirit or scope of the invention.

What is claimed is:

1. A polymer containing (A) 40 to 99.9 parts by weight of bound 1,3-butadiene monomer, (B) 0.05 to 5.0 parts by weight of bound divinyl benzene monomer and (C) 0 to 59.9 parts by weight of bound acrylonitrile mono-

TABLE I

| Experiment | Stabilizer | Parts | Original color [1] | Mooney rise [2] ($\Delta$ML-4) | Masticated condition | Brabender curve shape [3] |
|---|---|---|---|---|---|---|
| A | 2,6-ditert.butyl-4-methyl phenol | 2.0 | Off white | +83 | Crumbled | PH. |
| B | 2,6-ditert.hexyl-4-methyl phenol | 2.0 | Equal | +73 | do | PH. |
| C | 4,4'-thiobis(3-methyl-6-tert.butyl phenol) | 2.0 | do | +84 | do | PH. |
| D | 2,5-ditert.amyl hydroquinone | 2.0 | Very slightly darker | +48 | Semi-massed | NH. |
| E | 2,2'-methylene bis (4.methyl-6-nonylphenol) | 2.0 | Pink | +58 | do | RH to NH. |
| F | A.O. 439 [4] | 2.0 | Equal | +81 | Massed | Do. |
| G | 2,2'-methylenebis (4-methyl-6-tert.butyl phenol) | 2.0 | Greenish gray | +74 | do | Do. |
| H | 2,5-ditert.amyl hydroquinone and A.O. 439 [4] | 1.0/1.0 | Slightly darker | +17 | do | NH. |
| I | 2,5-tert.amyl hydroquinone and A.O. 439 [4] | 1.5/0.5 | do | +23 | do | NH. |
| J | 2,2'-methylenebis [4-methyl-6-($\alpha$-methylcyclohexyl) phenol] | 2.0 | Pink | +37 | do | NH. |
| K | 2,6-ditert.butyl-4-methylol phenol | 2.0 | Equal | −27 | do | NH. |
| L | 2,5-ditert.amyl hydroquinone | 1.0 | do | +19 | do | NH. |
| M | 2,5-tert.amyl hydroquinone | 0.75 | do | +23 | do | NH. |
| N | 2,5-tert.amyl hydroquinone | 0.5 | do | +27 | do | NH. |
| O | 4,4'-methylenebis (2,6-ditert.butyl phenol) | 2.0 | Yellow | −4 | Semi-massed | NH. |
| P | 2,6-ditert.butyl-4-methylol phenol | 0.5 | Slightly yellow | −25 | Massed | NH. |
| Q | Methylene bridged polyalkyl phenols | 2.0 | Yellow | +13 | Semi-massed | NH. |
| R | 2,6-ditert.butyl-4-methoxy methyl phenol | 2.0 | do | +33 | do | NH. |
| S | $\alpha,\alpha'$-di(4-hydroxy-3,5-ditert.butyl phenyl) dimethyl ether | 2.0 | About equal | +9 | Crumbled | NH. |
| T | 2,5-di($\alpha$-phenylethyl) hydroquinone | 2.0 | do | +80 | do | NH. |
| U | Reaction product of 2:1 styrene/hydroquinone [5] | 2.0 | Darker yellow | +76 | Semi-massed | NH. |
| V | Reaction product of 1:1:1 hydroquinone/styrene/isobutylene [5] | 2.0 | Yellow | +77 | do | NH. |

[1] Color comparisons are based upon the original color of the polymer of Experiment A.
[2] Original ML-4 (212° F.) of about 100. Mooney rise is the post mastication Mooney minus the original Mooney.
[3] PH=pronounced hump; RH=reduced hump or delayed hump; NH=no hump.
[4] An alkylated bis phenol having a dimethyl sulfide linkage.
[5] Prepared in a xylene solvent using toluene sulfonic acid as the catalyst.

As is apparent in the above data, the stabilized polymers of Experiments D through V were relatively non-discolored. As recited earlier herein, all of the polymers of Experiments D through V exhibited torque curves which contained no hump or an appreciably diminished hump or a hump delayed in its formation.

It is theorized that although a compound can reduce post polymerization DVB crosslinking, it may not be completely effective in reducing oxidative degradation and, therefore, although effective in preventing post polymerization DVB type crosslinking it may not be completely effective in preventing oxidative degradation. Oxidative degradation can be reflected in high viscosity (Mooney) rises on mastication and/or by a masticated polymer in a crumbled condition. It is desirable that the compounds aid in the prevention of both post polymerization DVB crosslinking and oxidative degradation. Therefore, the stabilizers used in the above Experiments D through V and related compounds, which also aid appreciably in the prevention of oxidative degradation as reflected in low Mooney rises and masticated polymers in a massed or semi-massed condition, are preferred. All of the polymers stabilized with additives outside the scope of the present invention, Experiments A through C, exhibited significant Brabender curve humps and had high Mooney rises (+73 mer wherein the sum of (A) plus (B) plus (C) equals 100 parts by weight of polymer and having incorporated therein a stabilizing amount of at least one phenolic compound conforming to the following structural formula:

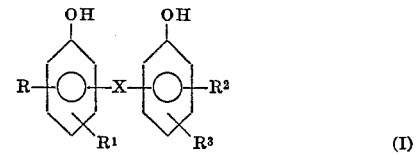

(I)

wherein R, $R^1$, $R^2$ and $R^3$ are selected from the group consisting of hydrogen, alkyl radicals containing 1 to 12 carbon atoms, cycloalkyl radicals containing 5 to 9 carbon atoms and aralkyl radicals containing 7 to 12 carbon atoms and X is selected from the group consisting of —CH$_2$—O—CH$_2$—, —CH$_2$—S—CH$_2$— and

wherein $R^4$ and $R^5$ are selected from the group consisting of hydrogen and alkyl radicals containing 1 to 7 carbon atoms and the sum of the carbon atoms in $R^4$ plus $R^5$ is 0 to 7.

2. The polymer according to claim 1 wherein X is selected from the group consisting of —CH₂—O—CH₂— and —CH₂—.

3. The polymer according to claim 1 wherein X is —CH₂—.

4. The polymer according to claim 1 wherein the phenolic compound is selected from the group consisting of 2,2'-methylenebis(4-methylphenol)
4,4'-isopropylidene bis phenol
α,α'-di(2-hydroxy-5-methylphenyl)dimethylether
α,α'-di(2-hydroxy-5-methylphenyl)dimethyl sulfide
2,2'-methylene bis(3-α-phenylethyl-5-methylphenol)
4,4'-isopropylidene bis(2-dimethylbenzylphenol)
α,α-di(2-hydroxy-3-cyclohexyl-5-methylphenyl)dimethylether
α,α'-di(2-hydroxy-3-α-tolylethyl-5-methylphenyl)dimethyl sulfide
2,2'-methylenebis(2,4-dimethylphenol)
α,α'-di(2-hydroxy-3-butyl-5-methylphenyl)dimethylether
α,α'-di(2-hydroxy-3,5-dimethylphenyl)dimethyl sulfide
2,2'-methylene bis(6-tert.butyl-4-methylphenol)
4,4'-methylenebis(2,6-ditert.butylphenol)
4,4'-isopropylidenebis(2-tert.hexylphenol)
α,α'-di(2-hydroxy-3-butyl-5-tert.amylphenyl)dimethylether and
α,α'-di(2-hydroxy-3-tert.hexyl-5-methylphenyl)dimethyl sulfide.

5. The polymer according to claim 1 wherein the polymer contains (A) 55 to 84.9 parts by weight of bound 1,3-butadiene monomer, (B) 0.10 to 2.5 parts by weight of bound divinyl benzene and (C) 15 to 44.9 parts by weight of bound acrylonitrile monomer wherein the sum of (A) plus (B) plus (C) equals 100 parts by weight of polymer.

6. The polymer according to claim 5 wherein the phenolic compound is selected from the group consisting of 2,2'-methylene bis(4-methyl-6-nonyl phenol)
2,2'-methylene bis(4-methyl-6-tert.butyl phenol)
2,2'-methylene bis[4-methyl-6-(α-methyl-cyclohexyl) phenol]
4,4'-methylene bis(2,6-ditert.butyl phenol)
α,α'-di(4-hydroxyl-3,5-ditert.butyl phenyl)dimethylether.

References Cited

UNITED STATES PATENTS

| 3,355,419 | 11/1967 | Cook | 260—83.7 |
| 3,355,421 | 11/1967 | Cook | 260—45.95 |
| 2,274,258 | 9/1966 | Odenweller | 260—45.95 |
| 2,115,465 | 12/1963 | Orloff et al. | 260—45.95 |

OTHER REFERENCES

Atmospheric Oxidation and Antioxidants by Gerald Scott, Elsevier Publ. Co., 1965, New York, U.S. Pat. Off. Sci. Lib. #QD281O9S35, pp. 468 and 469.

The Vanderbilt Rubber Handbook, 1958 edition, R. T. Vanderbilt Co. Inc., New York, N.Y., pp. 382 and 383.

DONALD E. CZAJA, Primary Examiner

V. P. HOKE, Assistant Examiner

U.S. Cl. X.R.

260—45.95 C